Aug. 13, 1957
J. H. WALLACE
2,802,248
TIGHTENING AND HOLDING DEVICE
Filed July 24, 1953
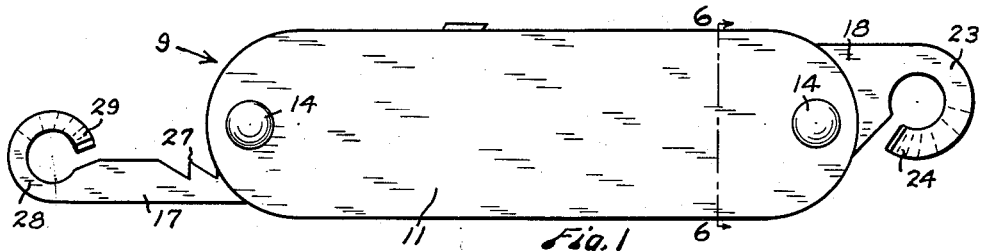
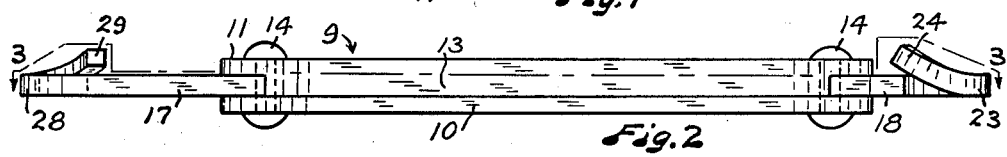
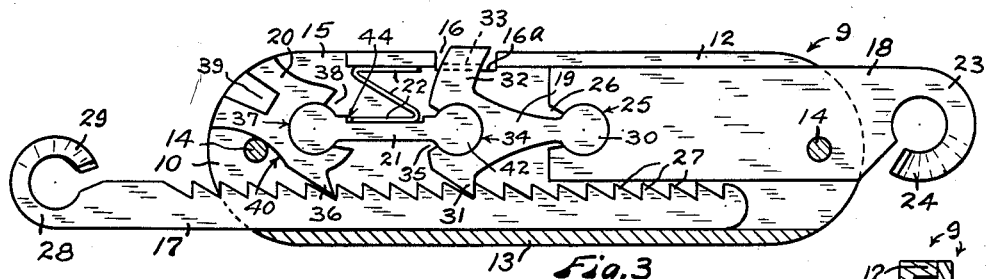
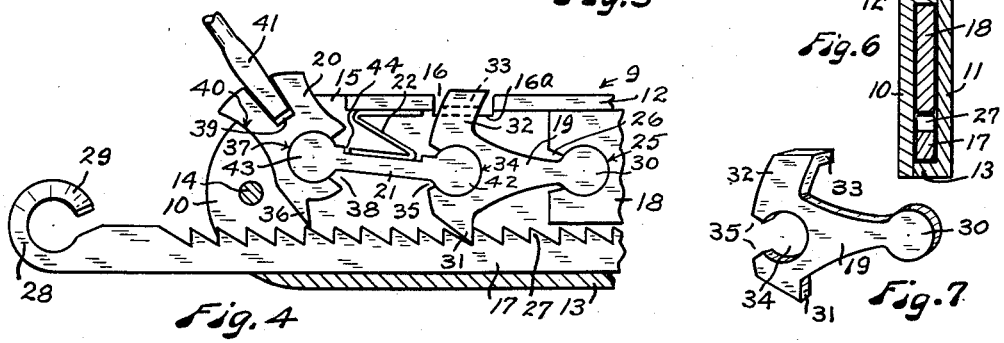
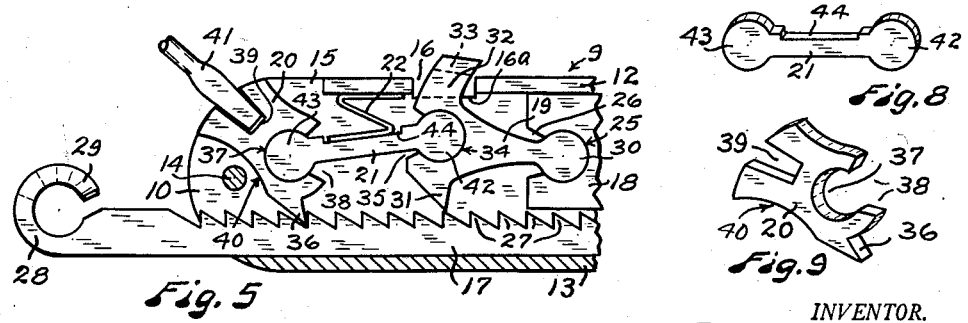
INVENTOR.
James H. Wallace
BY Fred C. Matheny
ATTORNEY

United States Patent Office 2,802,248
Patented Aug. 13, 1957

2,802,248

TIGHTENING AND HOLDING DEVICE

James H. Wallace, Puyallup, Wash.

Application July 24, 1953, Serial No. 369,978

6 Claims. (Cl. 24—68)

This invention relates to a tightening and holding device or jack.

An object of this invention is to provide a tightening and holding device or jack of simple and efficient construction which is capable of exerting and maintaining a pull or a tension on substantially any member or members with which it can be connected.

Another object is to provide a tightening and holding device which is especially well adapted for use in tightening and holding non-skid tire chains on the wheels of motor vehicles and which may also be used for other pulling or tightening purposes, such as for tightening and holding guy lines, stays, binders on loads and the like.

Another object is to provide a tightening and holding device which will make it easier to properly apply non-skid chains to tires and easier to remove the same from tires and which will provide for properly tensioning said chains and will hold the chains firmly and securely and reduce the danger of breaking or losing the chains thus making driving with chains more safe.

Another object is to provide a tightening and holding device in which a ratchet bar is operatively moved and held within a frame or housing by mechanism including a pulling dog and a holding dog which are connected with each other by a floating link.

Other objects of the invention will be apparent from the following description taken in connection with the accompanying drawings.

In the drawings Figure 1 is a side view of a tightening and holding device constructed in accordance with this invention.

Fig. 2 is an edge view of the same.

Fig. 3 is a sectional view taken substantially on broken line 3—3 of Fig. 2 and with the operating mechanism of the device shown in plan.

Fig. 4 is a fragmentary view similar to Fig. 3 but with the operating parts of the device shown in a different position.

Fig. 5 is another fragmentary view similar to Figs. 3 and 4 but with the operating parts shown in still another position.

Fig. 6 is a view in cross section taken substantially on broken line 6—6 of Fig. 1.

Fig. 7 is a detached perspective view of a holding dog.

Fig. 8 is a detached perspective view of a floating link.

Fig. 9 is a detached perspective view of a pulling or power application dog.

Like reference numerals designate like parts throughout the several views.

This tightening and holding device comprises a box like housing 9 preferably formed of two housing plates 10 and 11. The housing plates 10 and 11 have relatively narrow, perpendicular, integral edge forming flanges 12 and 13 respectively. Each edge forming flange extends along one side only of its housing plate leaving the other side and the ends of the plate unobstructed. The edge forming flanges 12 and 13 of the housing plates 10 and 11 are of equal but relatively narrow width and the housing plates are positioned with their flanged sides toward each other so that a relatively thin housing which is open at both ends is provided. The two housing members formed by plates 10 and 11 with flanges 12 and 13 are of similar construction except that the edge forming flange of one of the plates, such as the flange 12 of plate 10, see Figs. 3, 4 and 5, is cut away at two locations to leave two notches 15 and 16, the notch 15 being adjacent an end of the plate 10 and the other notch 16 being spaced from the notch 15.

The housing plates 10 and 11 are secured together in assembled relation by at least two cross fasteners 14, herein disclosed as rivets but which can be bolts or screws.

The mechanism within the housing 9 comprises a longitudinally movable ratchet bar 17, a tension bar or plate 18, a holding dog 19, a pulling or operating dog 20, a floating link 21 connecting the two dogs 19 and 20 and a spring 22, which preferably is of Z shape. Preferably the housing plates 10 and 11 are rounded at the ends, as shown in Figs. 1, 3, 4 and 5. Also preferably each of the parts 17, 18, 19, 20 and 21 is formed of flat metal and is of one piece construction. This minimizes construction costs as these parts can be formed by stamping.

The tension plate 18 is rigidly secured to the housing plates 10 and 11 by at least one of the fastener members 14. The outer end portion of the tension plate 18 extends beyond the adjacent ends of the housing plates 10 and 11 and is provided with a hook 23 which has a transversely displaced tip portion 24. The inner end portion of the tension plate 18 has a transversely extending circular opening 25 which is intersected by a slot or passageway 26 of a width less than the diameter of said opening 25. The slot 26 extends between the inner end of the plate 18 and the opening 25 and said slot 26 and opening 25 combine to form a notch shaped somewhat like the larger end of a keyhole. At least one wall of the slot 26 is inclined so that said slot is of expanding width from the opening 25 outwardly.

The ratchet bar 17 has ratchet teeth 27. One end of said ratchet bar 17 protrudes from the end of the housing 9 opposite to the end from which the tension plate 18 protrudes. This outwardly protruding end of the ratchet bar 17 terminates in a hook 28 having a transversely offset tip portion 29.

The holding dog 19 is shaped somewhat like a letter T and has a circular disc 30 on one end thereof. The end portion of the holding dog 19 opposite the disc 30 has a ratchet bar engaging pawl 31 extending sidewise therefrom in one direction and has a release arm 32 with an offset tip 33 extending sidewise therefrom in the opposite direction. The previously described notch 16 of the flange 12 also extends entirely through the housing plate 10 and the outer end portion of the release arm 32, including the offset portion 33, are operatively disposed within said notch 16. The pawl 31 engages with the ratchet teeth 27 of the bar 17. The end portion of the holding dog opposite to the disc 30 is further provided with a notch of keyhole shape comprising a transversely extending circular opening 34 intersected by an outwardly expanding passageway 35. The disc 30 of the holding dog 19 is received within the circular opening 25 of the tension plate 18 and the stem of the holding dog operates in the slot 26 of said tension plate 18.

The pulling dog 20 has a pawl 36 positioned to engage with the teeth 27 of ratchet bar 17. Also said pulling dog has a notch extending from the marginal portion thereof inwardly, said notch being shaped like the larger end portion of a keyhole and comprising a circular opening 37 and an outwardly expanding mouth portion or passageway 38. Said pulling dog 20 is further provided with a handle receiving notch 39 extending from the margin thereof inwardly at a location approximately opposite the keyhole shaped notch 37, 38. The notch 39 is readily accessible from the adjacent open end of the frame 9. Any suitable lever type operating member, such as a screw driver blade 41 may be inserted in the notch 39 and used as a handle to impart oscillating movement to the pulling dog 20. Preferably one of the frame securing rivets 14 is positioned for engagement with a curved edge 40 of the pulling dog 20 and this rivet cooperates in guiding and positioning and limiting free movement of the pulling dog 20.

The floating link 21 has two disc parts 42 and 43 at its respective ends and the stem part of said floating link is narrower than the diameter of the disc parts 42 and 43 and has a relatively long notch 44 in one edge thereof to receive the Z-shaped spring 22. The disc parts 42 and 43 engage, respectively, within the circular opening 34 of the holding dog 19 and the circular opening 37 of the pulling dog 20.

Obviously metal or any other suitable material may be used in constructing this device and the device may be made in any suitable size, depending on the use to which it is to be put.

In the operation of this device the two hook members 23 and 28 are engaged with two parts which are to be drawn toward each other and held, such as the two end portions of a non-skid tire chain which extends around a tire, it being understood that two of these devices will ordinarily be used in connection with each non-skid tire chain. Slack can be taken up by exerting pressure on the ratchet bar while holding the housing 9. Tension or pull can be exerted by inserting the end of a handle member 41 into the notch 39 of the pulling dog 20 and imparting oscillation to said pulling dog. The pulling dog 20 is floatingly supported from the tension plate 18 by the floating link 21 and holding dog 19. Oscillation of the pulling dog 20 will, by successive movements, retract the ratchet bar 17 into the housing 9 and the holding dog 19 will function as a pawl to hold said ratchet bar against outward movement. The spring 22 yieldingly urges both dogs 19 and 20 into engagement with the ratchet bar 17 at all times. Obviously the shape of this spring may be varied.

When the parts are in the position shown in Fig. 3 and the device is under tension the holding dog 19 will be carrying the load. To exert a further pull the pulling dog 20 will be angularly moved clockwise as respects the showing in Fig. 3, through and slightly beyond the position in which it is shown in Fig. 4. Thus the pulling dog will be caused to snap into engagement with the next succeeding ratchet tooth 27. Then by reversing the angular movement of the pulling dog, Fig. 5, power may be applied to further relatively telescope said ratchet bar 17 and housing 9. As the ratchet bar 17 moves into the housing 9 the teeth 27 pass under the holding dog pawl 31 by moving the holding dog 19 sidewise away from the ratchet bar 17, as shown in Fig. 5. The floating connection of the pulling dog 20 with the holding dog 19 by the link 21 provides a very efficient movement of the two dogs and contributes to the smoothness of operation of the device.

The usual method of quickly releasing the device when it is under tension is to insert an instrument, such as a screw driver blade, between the inner side of the release arm part 33 and the adjacent housing wall 16a at the bottom of the slot 16 and pry the holding dog 19 outwardly into a ratchet bar releasing position. When this is done the pulling dog 20, if unrestrained, will yield readily and permit the teeth 27 of ratchet bar 17 to slide past it. This provides for quick and easy release. Also obviously the ratchet bar can be backed up or released one notch at a time by simultaneously using a handle to manipulate the pulling dog 20 and a screw driver or like instrument to release the holding dog 19. Thus if this device is supporting a load in a raised position the load may be lowered slowly, one notch at a time, without dropping it. It is to be noted that strain due to tension is not borne by the frame but is transmitted directly through the ratchet bar, the two dogs 19 and 20, the floating link 21 and the tension plate 18.

The foregoing description and accompanying drawings clearly disclose a preferred embodiment of my invention but it will be understood that changes may be made within the scope of the following claims.

I claim:

1. In a tightening and holding device, a frame having means at one end thereof for attachment to a load; a ratchet bar guided for longitudinal movement in said frame and protruding from the other end of said frame and having means on its protruding end for attachment to a load; a holding dog pivotally connected with said frame and having a pawl engaging said ratchet bar; a lever operated pulling dog floatingly guided by said frame and free from direct connection with said frame and having a pawl engaging said ratchet bar; a floating link connecting said two dogs and providing a floating pivot for said pulling dog; and spring means resiliently urging said two dogs toward said ratchet bar.

2. In a tightening and holding device, a frame; a tension plate secured within said frame and protruding from one end thereof and having means on its protruding end for attachment to a load; a ratchet bar guided for longitudinal movement in said frame and protruding from the other end of said frame and having means on its protruding end for attachment to a load; a holding dog pivotally connected with said tension plate and having a pawl engaging said ratchet bar; a lever operated pulling dog floatingly guided by said frame and free from direct connection with said frame and having a pawl engaging said ratchet bar; a floating link connecting said two dogs, whereby load strain is transmitted directly through the ratchet bar and two dogs and floating link and tension plate and said link providing a floating pivot for said pulling dog; and spring means yieldingly urging the two dogs toward the ratchet bar.

3. In a tightening and holding device, a frame having means at one end thereof for attachment to a load; a ratchet bar guided for longitudinal movement in said frame and protruding from the other end of said frame and having means on its protruding end for attachment to a load; a holding dog pivotally connected with said frame and having a pawl engaging said ratchet bar; a lever operated pulling dog spaced from said holding dog and having a pawl engaging said ratchet bar; said two dogs having opposed notches in their adjacent edges and each notch comprising a circular opening and an expanding mouth portion of a width less than the diameter of the circular opening at the location where it merges with the circular opening; a floating link connecting said two dogs, said link having a stem provided at its respective ends with two disc members fitting within the circular openings in said dogs; and spring means resiliently urging said two dogs toward said ratchet bar.

4. In a tightening and holding device, two frame plates each having a narrow perpendicular flange extending along one edge thereof, said frame plates being positioned in face to face relation with their flanges inwardly directed and forming the side walls of a relatvely thin box shaped frame which is open at the ends; means securing said two frame plates together; a ratchet bar guided for longitudinal movement in said frame and protruding from one end thereof and having means on its protruding end for attachment to a load; a tension plate rigidly secured in said frame and protruding from the opposite end thereof and having means on its protruding end for attachment to a load; a holding dog pivotally connected with said tension plate and having a pawl engaging said ratchet bar; a lever operated pulling dog spaced from said holding dog and having a pawl engaging said ratchet bar; a floating link connecting said two dogs; and spring means urging said two dogs toward said ratchet bar.

5. The apparatus as claimed in claim 4 in which the pulling dog is provided with a handle receiving notch which is accessible through the adjacent open end of said housing.

6. The apparatus as claimed in claim 4 in which the flanged edge portion of one frame plate is provided with a notch and the holding dog is provided with a release arm extending outwardly through said notch.

References Cited in the file of this patent

UNITED STATES PATENTS

| | | |
|---|---|---|
| 463,385 | Griffin | Nov. 17, 1891 |
| 963,052 | Lemak | July 5, 1910 |
| 1,656,776 | Davidson | Jan. 17, 1928 |